(12) United States Patent
Guarnieri

(10) Patent No.: US 9,384,427 B2
(45) Date of Patent: Jul. 5, 2016

(54) SYSTEMS AND METHODS FOR OPTIMIZING PIXEL BASED RASTER TRAPPING

(75) Inventor: Stuart Guarnieri, Laramie, WY (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 2238 days.

(21) Appl. No.: 12/336,261

(22) Filed: Dec. 16, 2008

(65) Prior Publication Data

US 2010/0149201 A1  Jun. 17, 2010

(51) Int. Cl.
*G09G 5/36* (2006.01)
*G06K 15/02* (2006.01)

(52) U.S. Cl.
CPC ............ *G06K 15/02* (2013.01); *G06K 15/1822* (2013.01); *G06K 15/1826* (2013.01); *G06K 15/1849* (2013.01)

(58) Field of Classification Search
None
See application file for complete search history.

(56) References Cited

U.S. PATENT DOCUMENTS

| | | | |
|---|---|---|---|
| 4,583,116 A | 4/1986 | Hennig et al. | |
| 4,700,399 A | 10/1987 | Yoshida | |
| 4,931,861 A | 6/1990 | Taniguchi | |
| 5,131,058 A | 7/1992 | Ting et al. | |
| 5,204,918 A | 4/1993 | Hirosawa | |
| 5,241,396 A | 8/1993 | Harrington | |
| 5,295,236 A | 3/1994 | Bjorge et al. | |
| 5,313,570 A | 5/1994 | Dermer et al. | |
| 5,386,223 A | 1/1995 | Saitoh et al. | |
| 5,386,483 A | 1/1995 | Shibazaki | |
| 5,402,530 A | 3/1995 | Boenke et al. | |
| 5,440,652 A | 8/1995 | Ting | |
| 5,513,300 A | 4/1996 | Shibazaki | |
| 5,542,052 A | 7/1996 | Deutsch et al. | |
| 5,613,046 A | 3/1997 | Dermer | |
| 5,615,314 A | 3/1997 | Schoenzeit et al. | |
| 5,666,543 A | 9/1997 | Gartland | |
| 5,668,931 A | 9/1997 | Dermer | |
| 6,341,020 B1 | 1/2002 | Rumph et al. | |
| 6,345,117 B2 | 2/2002 | Klassen | |
| 6,366,361 B1 | 4/2002 | Dermer et al. | |
| 6,377,711 B1 * | 4/2002 | Morgana | 382/274 |

(Continued)

FOREIGN PATENT DOCUMENTS

| | | |
|---|---|---|
| EP | 0 901 096 B1 | 3/1999 |
| EP | 0 996 281 A2 | 4/2000 |

(Continued)

OTHER PUBLICATIONS

U.S. Appl. No. 12/286,642, filed Sep. 30, 2008.

(Continued)

*Primary Examiner* — Anh-Tuan V Nguyen
(74) *Attorney, Agent, or Firm* — Osha Liang LLP

(57) ABSTRACT

Methods disclosed permit the identification of frame buffer pixels for trapping. In some embodiments, flags associated with pixels in the frame buffer may be used to provide an indication of pixels for trapping. A bit in a flag associated with a pixel may be set when the pixel is painted, if the luminosity value of the pixel does not exceed a luminosity threshold. In some embodiments, the method discloses a process for updating the value of the bit through the rasterization process. The pixel may be identified as a candidate for trapping based on the value of the at least one bit at trapping time.

20 Claims, 10 Drawing Sheets

(56) References Cited

U.S. PATENT DOCUMENTS

| | | | |
|---|---|---|---|
| 6,378,983 | B1 | 4/2002 | Ito et al. |
| 6,549,303 | B1 | 4/2003 | Trask |
| 6,738,159 | B2 | 5/2004 | Harrington |
| 6,992,798 | B2 * | 1/2006 | Geurts et al. ............ 358/3.15 |
| 7,123,381 | B2 | 10/2006 | Klassen |
| 7,139,098 | B2 | 11/2006 | Klassen |
| 7,164,498 | B2 | 1/2007 | Van Bael |
| 7,259,784 | B2 | 8/2007 | Cutler |
| 7,263,218 | B2 | 8/2007 | Altenhof-Long et al. |
| 7,362,467 | B1 | 4/2008 | Tsukimura |
| 7,411,707 | B2 | 8/2008 | Ikeda |
| 7,639,399 | B2 | 12/2009 | Ikeda |
| 7,679,619 | B2 | 3/2010 | Ooga et al. |
| 7,724,393 | B2 * | 5/2010 | Segawa et al. ............ 358/1.9 |
| 7,817,305 | B2 * | 10/2010 | Joergens et al. ........... 358/1.9 |
| 7,826,095 | B2 * | 11/2010 | Wang et al. ............ 358/3.01 |
| 2001/0033686 | A1 | 10/2001 | Klassen |
| 2003/0044065 | A1 | 3/2003 | Harrington |
| 2003/0063301 | A1 | 4/2003 | Klassen |
| 2003/0090689 | A1 | 5/2003 | Klassen |
| 2004/0017595 | A1 | 1/2004 | Ikeda |
| 2004/0108384 | A1 * | 6/2004 | Wang et al. ............ 235/492 |
| 2005/0099642 | A1 | 5/2005 | Segawa et al. |
| 2006/0033960 | A1 * | 2/2006 | Allen ............ 358/3.26 |
| 2008/0007752 | A1 * | 1/2008 | Gandhi et al. ............ 358/1.9 |
| 2008/0094515 | A1 * | 4/2008 | Gutta et al. ............ 348/602 |
| 2010/0079815 | A1 | 4/2010 | Obrecht et al. |
| 2010/0079817 | A1 | 4/2010 | Guarnieri, et al. |

FOREIGN PATENT DOCUMENTS

| | | |
|---|---|---|
| EP | 0 996 282 B1 | 4/2000 |
| EP | 0 998 131 A2 | 5/2000 |
| EP | 1 166 548 B1 | 1/2002 |
| JP | 2006-005481 A | 1/2006 |
| JP | 2007-144929 A | 6/2007 |
| JP | 2007-221226 A | 8/2007 |
| JP | 2007-221227 A | 8/2007 |
| JP | 2008-072670 A | 3/2008 |
| WO | WO 00/57632 | 9/2000 |
| WO | WO 2008/062041 A1 | 5/2008 |

OTHER PUBLICATIONS

Office Action dated Feb. 3, 2011, in related U.S. Appl. No. 12/286,642, filed Sep. 30, 2008, Stuart Guarnieri.

U.S. Appl. No. 12/242,687, filed Sep. 30, 2008.

Office Action dated May 25, 2011, in related U.S. Appl. No. 12/242,687, filed Sep. 30, 2008, Douglas Obrecht.

Office Action in Japanese application No. 2009-284208, dated Oct. 22, 2013 along with English Translation (8 pages).

* cited by examiner

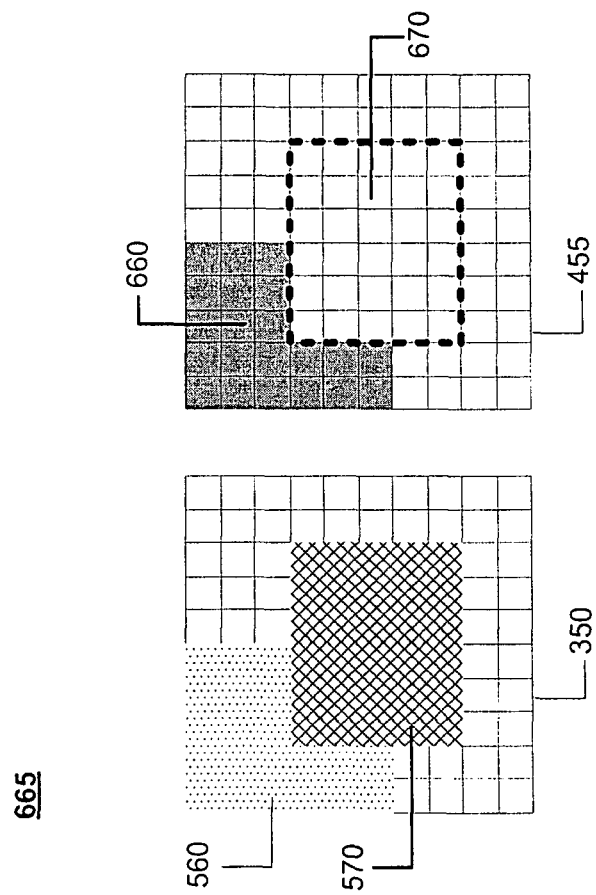

SYSTEMS AND METHODS FOR OPTIMIZING PIXEL BASED RASTER TRAPPING

BACKGROUND

1. Field of the Invention

The present invention relates to the field of printing and in particular, to systems and methods for performing trapping optimizations in print devices.

2. Description of Related Art

Pixels generated by a color printer typically consist of colors from multiple color planes. For example, in a color printer that uses cyan, magenta, yellow, and black ("CMYK"), a single pixel can consist of color from one or more of the four color planes. A wide range of colors may be produced by a printer when colors from constituent color planes are combined with differing intensities. The color components that make up a pixel are ideally printed on top of, or very close to one another. However, because of misregistration caused by print engine misalignment, paper stretching, and other mechanical imprecisions, the constituent color planes that make up a single pixel may not overlap adequately resulting in unsightly small white gaps between different-colored regions on the page, or in colored edges to black regions. To redress misregistration it is common to use a technique called trapping, which expands or contracts coloring regions slightly in order to eliminate white gaps and/or colored edges between graphical objects. Trapping introduces areas of color into color separations and masks the visible effects of misregistration.

Trapping is often implemented using raster-based trapping, which involves the computationally expensive step of finding object boundaries using data in the frame buffer that potentially spans multiple color planes. In large part, the computational cost arises because trapping may be performed on a pixel-by-pixel basis. When trapping is performed, color typically flows from pixels of higher luminosity in the trapping region to pixels of lower luminosity in the region. Accordingly, there may be a significant processing overhead to determine the luminosity of a pixel and the color contribution of the pixel within the trapping region.

For example, raster-based trapping performed even for a relatively small 3×3 pixel area with width=height=1 using a CMYK color model, involves checking and comparing no less than 36 pixel values (9 pixels across 4 planes) memory locations. Because the computational cost is associated to a large degree with a brute force pixel-by-pixel approach, significant reductions in computational cost may be achieved by reducing the number of pixels processed as potential trapping candidates. Thus, there is a need for systems and methods that decrease the computational cost associated with trapping by providing optimizations for pixel based raster trapping.

SUMMARY

Consistent with embodiments presented, a method for identifying at least one frame buffer pixel as a candidate for trapping is presented. In some embodiments, a method for identifying at least one frame buffer pixel associated with at least one display list object as a candidate for trapping can associate at least one flag with the frame buffer pixel and calculate a value for a first bit in the flag when rendering the frame buffer pixel to a frame buffer. Calculating may comprise setting the first bit in the flag, if the luminosity value of the frame buffer pixel does not exceed a luminosity threshold and the object is opaque. The first bit in the flag may be reset, if the luminosity value of the frame buffer pixel exceeds a luminosity threshold and the object is opaque. For non-opaque display list objects, the first bit in the flag may be set if a blended luminosity value of the frame buffer pixel does not exceed a luminosity threshold; if the blended luminosity value of the frame buffer pixel exceeds the luminosity threshold then the first bit in the flag may be reset. The frame buffer pixel may be identified as a candidate for trapping, if the first bit in the flag associated with the at least one frame buffer pixel has been set.

Embodiments also relate to software, firmware, and program instructions created, stored, accessed, or modified by processors using computer-readable media or computer-readable memory. The methods described may be performed on a computer and/or a printing device.

These and other embodiments are further explained below with respect to the following figures.

BRIEF DESCRIPTION OF THE DRAWINGS

FIGS. 6A, 6B, 6C, and 6D are exemplary illustrations of changes to painted flags associated with pixels when opaque and non-opaque operations are performed on graphical objects.

DETAILED DESCRIPTION

In accordance with embodiments reflecting various features of the present invention, systems and methods for implementing trapping using a second or intermediate form of printable data generated from a first printable data are presented. In some embodiments, the first printable data may take the form of a PDL description of a document and the intermediate printable data may take the form of a display list of objects generated from the PDL description.

Figure 1:
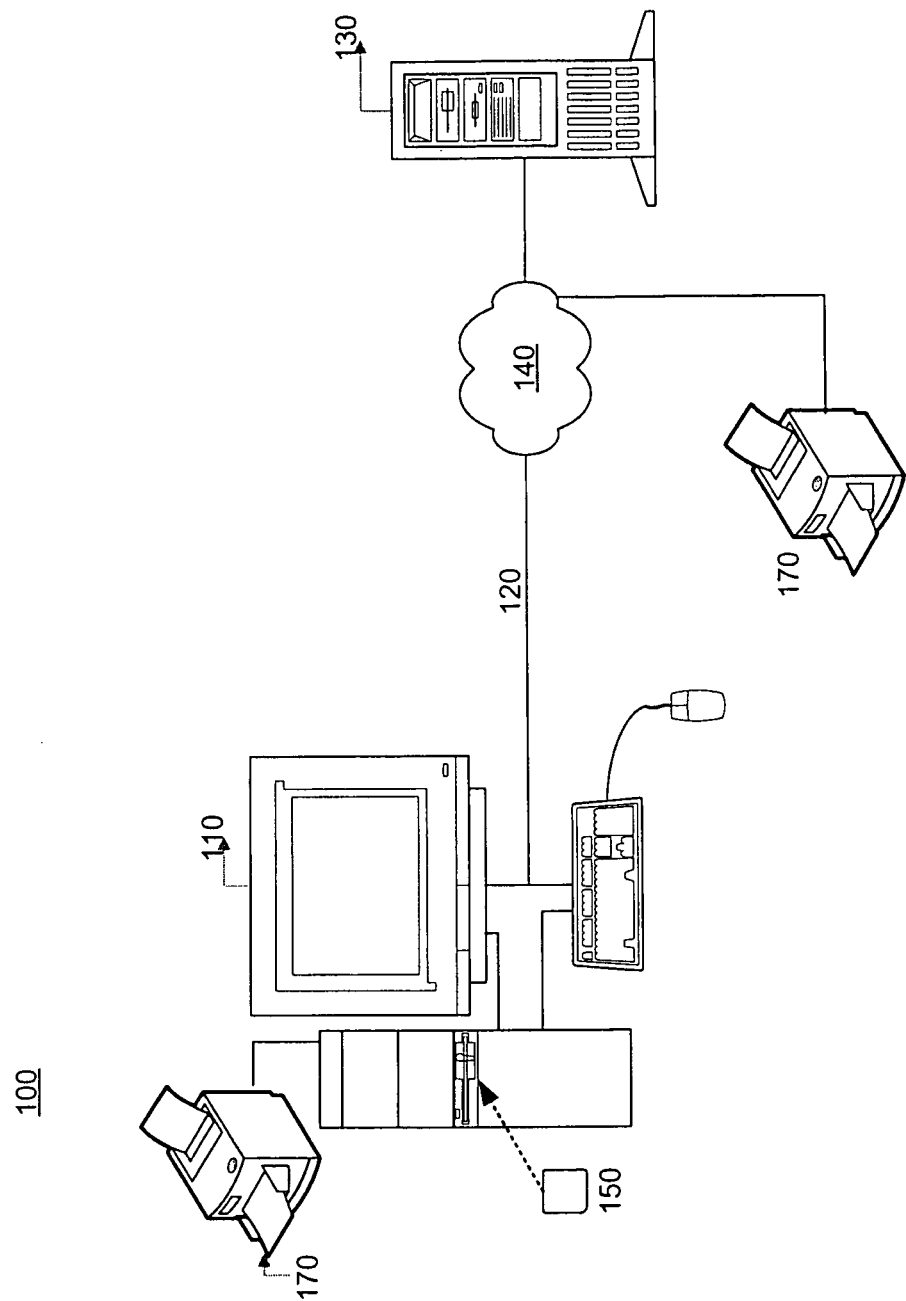
FIG. 1 shows a block diagram illustrating components in a system for printing documents consistent with some embodiments of the present invention.

FIG. 1 shows a block diagram illustrating components in an exemplary system for printing documents. An application for implementing trapping may be deployed on a network of computers and printing devices, as shown in FIG. 1, that are connected through communication links that allow information to be exchanged using conventional communication protocols and/or data port interfaces.

As shown in FIG. 1, exemplary system 100 includes computers including a computing device 110 and a server 130. Further, computing device 110 and server 130 may communicate over a connection 120, which may pass through network 140. Computing device 110 may be a computer workstation, desktop computer, laptop computer, or any other computing device capable of being used in a networked environment. Server 130 may be a platform capable of connecting to computing device 110 and other devices (not shown). Computing device 110 and server 130 may be capable of executing software (not shown) that allows the printing of documents using printers 170.

Document processing software running on computing device 110 and/or server 130 may allow users to view, edit, process, and store documents conveniently. Pages to print in a document may be described in a page description language ("PDL"). PDL's may include PostScript™, Adobe™ PDF, HP™ PCL, Microsoft™ XPS, and variants thereof. A PDL description of a document provides a high-level description of each page in a document. This PDL description is often translated to a series of lower-level printer-specific commands when the document is being printed.

The translation process from PDL to lower-level printer-specific commands may be complex and depend on the features and capabilities offered by exemplary printer 170. For example, printer 170 may process its data in stages. In a first stage, printer 170 may parse PDL commands and break down high-level instructions into a set of lower level instructions called primitives. These primitives may be fed to a subsequent stage in exemplary printer 170, which may use them to determine where to place marks on a page. In some instances, each primitive may be processed as it is generated. In other systems, a large set of primitives may be generated, stored, and then processed. For example, the primitives needed to describe a single page may be generated, stored in a list, and then processed. A set of stored primitives is termed an intermediate list or a display list.

In general, printer 170 may be any device that can be configured to produce physical documents from electronic data including, but not limited to, electro-photographic printers, such as laser printers and LED printers, ink-jet printers, thermal printers, laser imagers, and offset printers. Printer 170 may have an image transmitting/receiving function, an image scanning function, and/or a copying function, as installed in facsimile machines and digital copiers. Exemplary printer 170 may also be capable of directly printing documents received from computing device 110 or server 130 over connection 120. In some embodiments such an arrangement may allow for the direct printing of documents, with (or without) additional processing by computing device 110 or server 130. The processing of documents, which may contain one or more of text, graphics, and images, can be distributed. Thus, computing device 110, server 130, and/or the printer may perform portions of document print processing such as half-toning, color matching, and/or other manipulation processes before a document is physically printed by printer 170.

Computing device 110 also contains removable media drive 150. Removable media drive 150 may include, for example, 3.5 inch floppy drives, CD-ROM drives, DVD ROM drives, CD±RW or DVD±RW drives, USB flash drives, and/or any other removable media drives. Portions of applications may reside on removable media and be read by computing device 110 using removable media drive 150 prior to being acted upon by system 100.

Connection 120 couples computing device 110, server 130, and printer 170 and may be implemented as a wired or wireless connection using conventional communication protocols and/or data port interfaces. In general, connection 120 can be any communication channel that allows transmission of data between the devices. In one embodiment, for example, the devices may be provided with conventional data ports, such as parallel ports, serial ports, Ethernet, USB™, SCSI, FIREWIRE™, and/or coaxial cable ports for transmission of data through the appropriate connection.

Network 140 could include a Local Area Network (LAN), a Wide Area Network (WAN), or the Internet. In some embodiments, information sent over network 140 may be encrypted to ensure the security of the data being transmitted. Printer 170 may be connected to network 140 through connection 120. Exemplary printer 170 may also be connected directly to computing device 110 and/or server 130. System 100 may also include other peripheral devices (not shown). An application to implement trapping for print devices may be deployed on one or more of the exemplary computers or printers, as shown in FIG. 1. For example, computing device 110 could execute software that may be downloaded directly from server 130, and portions of the application may also be executed by exemplary printer 170.

Figure 2:
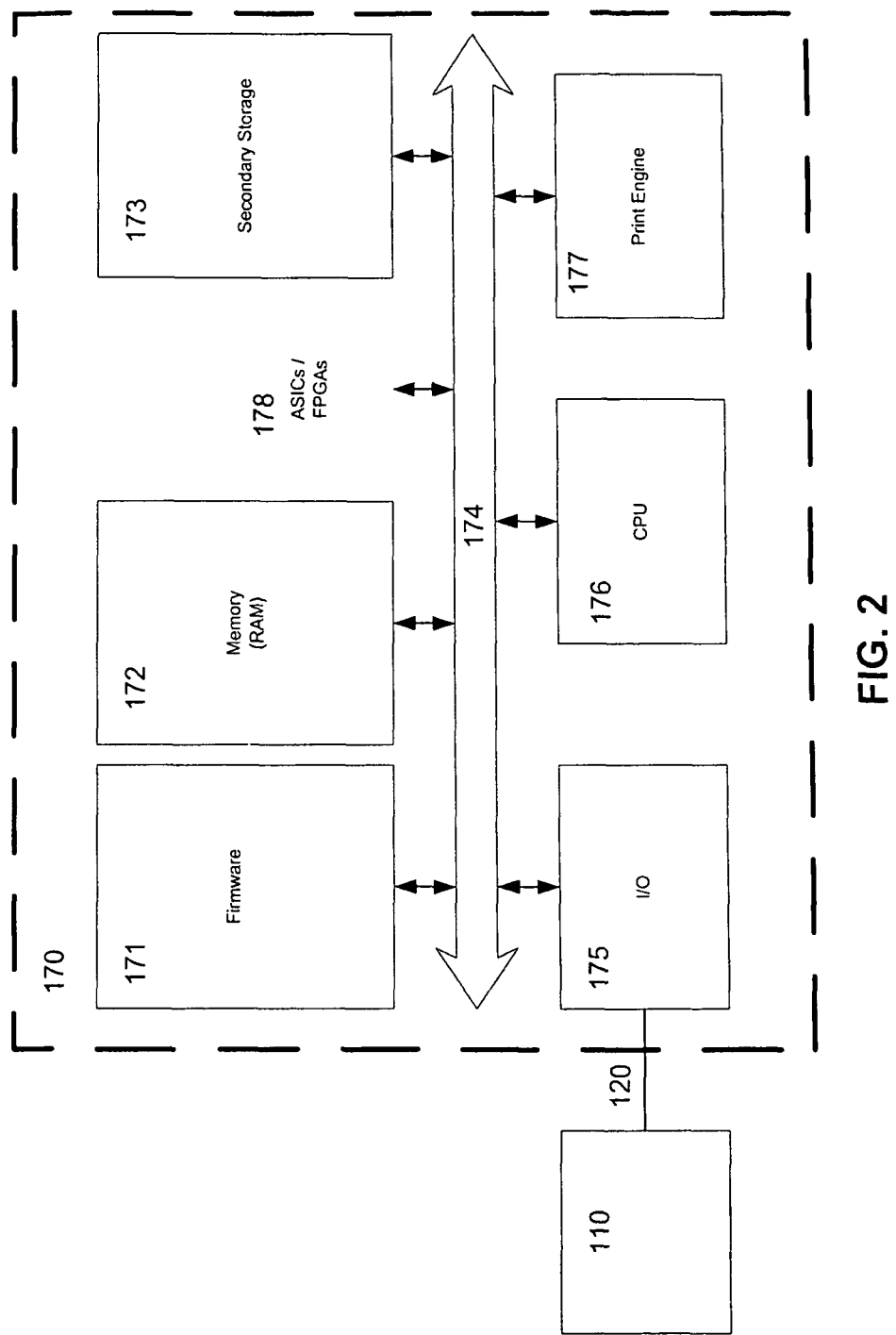
FIG. 2 shows a high level block diagram of an exemplary printer.

FIG. 2 shows a high-level block diagram of exemplary printer 170. Exemplary printer 170 may contain bus 174 that couples CPU 176, firmware 171, memory 172, input-output ports 175, print engine 177, and secondary storage device 173. Exemplary Printer 170 may also contain other Application Specific Integrated Circuits (ASICs), and/or Field Programmable Gate Arrays (FPGAs) 178 that are capable of executing portions of an application to print or process documents. Exemplary printer 170 may also be able to access secondary storage or other memory in computing device 110 using I/O ports 175 and connection 120. In some embodiments, printer 170 may also be capable of executing software including a printer operating system and other appropriate application software. Exemplary printer 170 may allow paper sizes, output trays, color selections, and print resolution, among other options, to be user-configurable.

Exemplary CPU 176 may be a general-purpose processor, a special purpose processor, or an embedded processor. CPU 176 can exchange data including control information and instructions with memory 172 and/or firmware 171. Memory 172 may be any type of Dynamic Random Access Memory ("DRAM") such as but not limited to SDRAM, or RDRAM. Firmware 171 may hold instructions and data including but not limited to a boot-up sequence, pre-defined routines including routines for image processing, trapping, document processing, and other code. In some embodiments, code and data in firmware 171 may be copied to memory 172 prior to being acted upon by CPU 176. Routines in firmware 171 may include code to translate page descriptions received from computing device 110 to display lists. In some embodiments, firmware 171 may include rasterization routines to convert display commands in a display list to an appropriate rasterized bit map and store the bit map in memory 172. Firmware 171 may also include compression, trapping, and memory management routines. Data and instructions in firmware 171 may be upgradeable using one or more of computer 110, network 140, removable media coupled to printer 170, and/or secondary storage 173.

Exemplary CPU 176 may act upon instructions and data and provide control and data to ASICs/FPGAs 178 and print engine 177 to generate printed documents. ASICs/FPGAs 178 may also provide control and data to print engine 177. FPGAs/ASICs 178 may also implement one or more of translation, trapping, compression, and rasterization algorithms.

Exemplary computing device 110 may transform document data into a first printable data. In some embodiments, the first printable data may correspond to a PDL description of a document. Then, the first printable data can be sent to printer 170 for transformation into intermediate printable data. In some embodiments, the translation process from a PDL description of a document to the final printable data comprising of a series of lower-level printer-specific commands may include the generation of intermediate printable data comprising of display lists of objects. Display lists may hold one or more of text, graphics, and image data objects and one or more types of data objects in a display list may correspond to an object in a user document.

Display lists, which may aid in the generation of final printable data, may be stored in memory 172 or secondary storage 173. Exemplary secondary storage 173 may be an internal or external hard disk, memory stick, or any other memory storage device capable of being used by system 200. In some embodiments, the display list may reside and be transferred between one or more of printer 170, computing device 110, and server 130 depending on where the document processing occurs. Memory to store display lists may be a dedicated memory or form part of general purpose memory, or some combination thereof. In some embodiments, memory to hold display lists may be dynamically allocated, managed, and released as needed. Printer 170 may transform intermediate printable data into a final form of printable data and print according to this final form.

Figure 3:
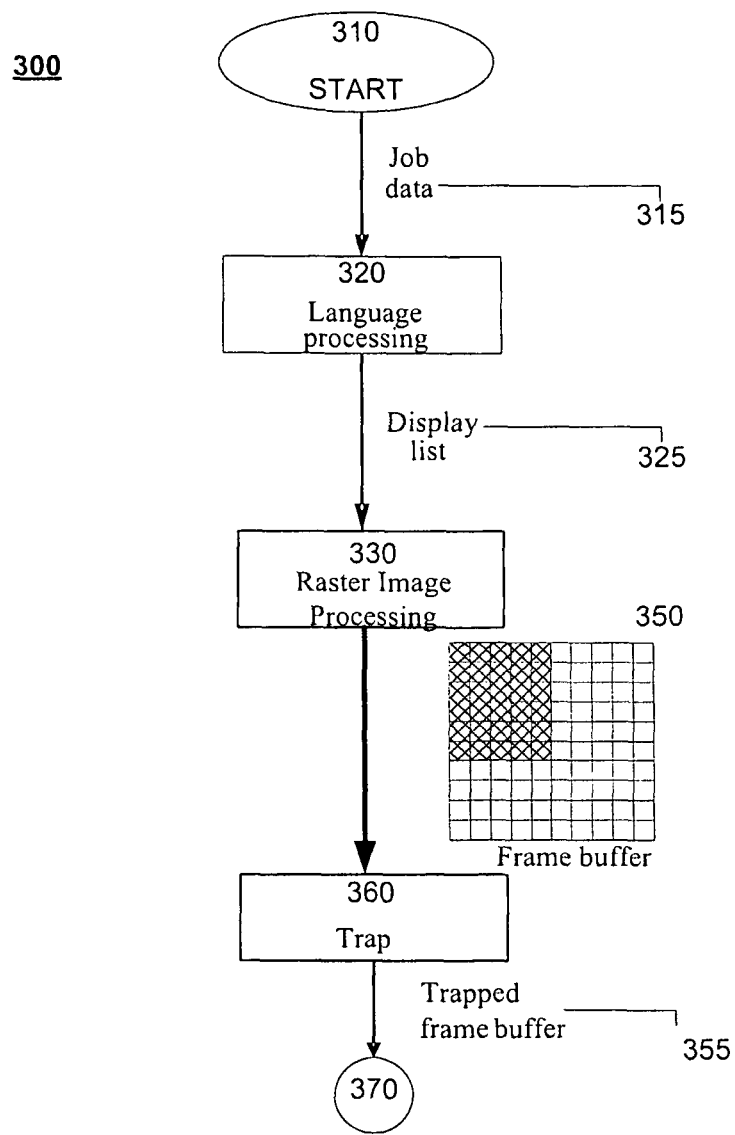
FIG. 3 shows an exemplary flowchart illustrating steps in a conventional method for performing trapping on data in the frame buffer utilized by a raster image processor.

FIG. 3 shows exemplary flowchart 300 illustrating steps in a conventional method for performing trapping on data in the frame buffer utilized by a raster image processor. The process may start in step 310 with the initiation of a print job. In step 320, print job data 315 can be subjected to language processing. In some embodiments, language processing may be performed by a language server. For example, a language server may take PDL language-level objects and transform the language level objects into data, image, text, and graphical objects and add these objects to display list 325.

Exemplary display list 325 may be an intermediate step in the processing of data prior to actual printing and may be parsed before conversion into a subsequent form. The conversion process from a display list representation to a form suitable for printing on physical media may be referred to as rasterizing the data or rasterization. Display list 325 may include such information as color, opacity, luminosity, boundary information, and depth for display list objects. For example, basic rasterization may be accomplished by taking a 3-dimensional scene, typically described using polygons, and rendering the 3-dimensional scene onto a 2-dimensional surface. Polygons can be represented as collections of triangles. A triangle may be represented by 3 vertices in the 3-dimensional space. A vertex defines a point, an endpoint of an edge, or a corner of a polygon where two edges meet. Thus, basic rasterization may transform a stream of vertices into corresponding 2-dimensional points and fill in the transformed 2-dimensional triangles. Upon rasterization, the rasterized data may be stored in a frame buffer, such as exemplary frame buffer 350, which may be physically located in memory 172. Print engine 177, may process the rasterized data in frame buffer 350, and form a printable image of the page on a print medium, such as paper.

In step 330, Raster Image Processing (RIP) module may process objects in display list 325 and generate a rasterized equivalent in frame buffer 350. In some embodiments, raster image processing may be performed by printer 170. For example, raster image processing may be performed by printer 170 using one or more of CPU 176, ASICs/FPGAs 178, memory 172, and/or secondary storage 173. Raster image processing may be performed by printer 170 using some combination of software, firmware, and/or specialized hardware such as ASICs/FPGAs 178. Frame buffer 350 may hold a representation of print objects in a form suitable for printing on a print medium by print engine 177.

Data in frame buffer 350 may then be subjected to trapping in step 360. Any of several well-known trapping algorithms may be used to perform trapping. Trapped frame buffer 355 may then be subjected to any additional processing in step 370. For example, print engine 177 may render trapped frame buffer 355 on a print medium after further processing. Because conventional trapping algorithms, which are typically performed on a pixel by pixel basis, can be computationally expensive, optimizations may permit reductions in computational complexity. In some embodiments disclosed herein, algorithms for optimizing the search for trapping regions may associate flags with pixels based on pixel and/or object attributes and use flag values for a pixel to determine trapping candidates.

Figure 4:
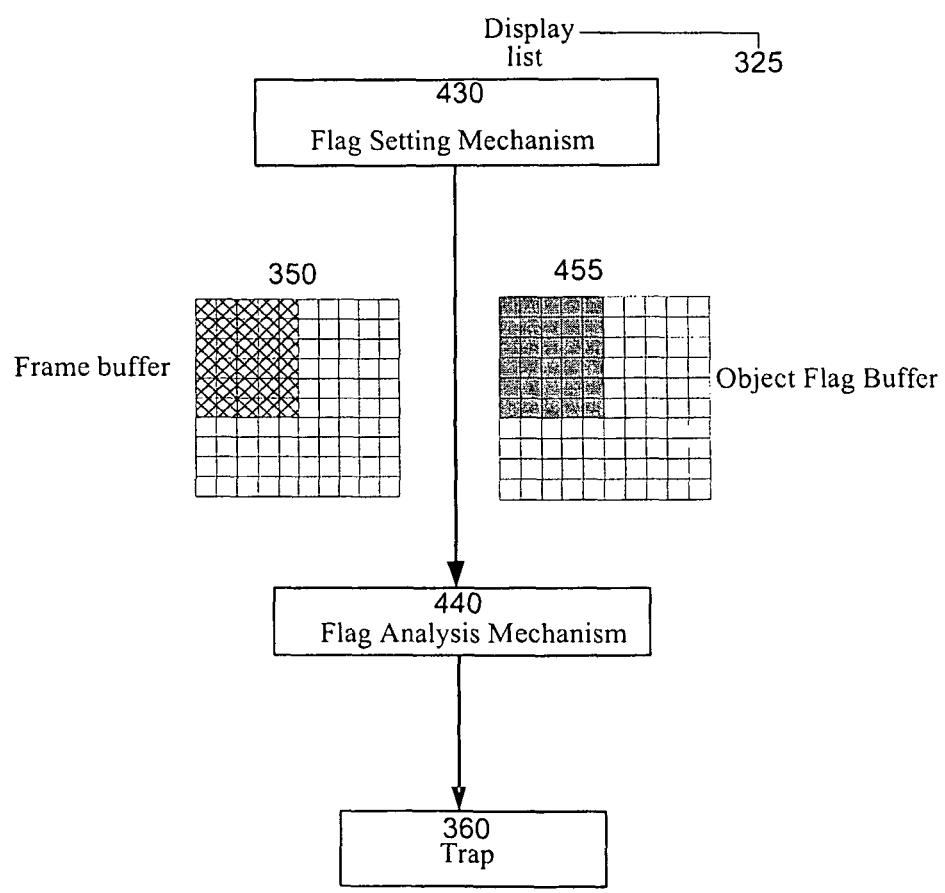
FIG. 4 shows exemplary flowchart illustrating steps in a method for trapping optimization.

FIG. 4 shows exemplary flowchart 400 illustrating steps in a method for trapping optimization. In some embodiments, the method shown in flowchart 400 may be performed using raster image processing module in step 330.

In some embodiments, pixels associated with an object of some color may be identified as "painted pixels". In some embodiments, a first bit or flag may be used to indicate whether a pixel is considered a painted or unpainted pixel, while a second bit or flag may be used to indicate whether the pixel is painted or unpainted for trapping purposes based on the values of one or more pixel attributes. Accordingly, a pixel that is painted (associated with a color object) based on the value of one indicator, may be considered as unpainted for trapping purposes based on the value of another indicator. For example, optimizations disclosed herein may be used to eliminate pixels as trapping candidates so that a first flag may indicate that the pixel is painted, while the second flag may indicate that the pixel is unpainted for trapping purposes.

Note that trapping algorithms typically disregard pixels that are considered unpainted, which can correspond to "white" or blank sections on a printed page. Because trapping candidates arise from painted pixels, pixels that are indicated as unpainted to the trapping algorithm may be disregarded thereby reducing the number of pixels checked for trapping. In some embodiments, color regions considered as unpainted may be identified to trapping algorithms thereby permitting reductions to the search space for trapping candidates. In some embodiments, one or more flags may be associated with a pixel based on pixel attributes and/or attributes of objects associated with the pixel, and can be used to indicate pixel characteristics that increase or decrease the likelihood that pixel will be included as a candidate for trapping. For example, in one embodiment, flags may be used indicate whether a pixel is considered as "painted" or "unpainted" for the purposes of a trapping algorithm.

In step 430 of the exemplary flowchart 400, a flag setting routine may be implemented in one embodiment at the time of rasterization, or, in another embodiment, just prior to the rasterization of data in frame buffer 350. In step 430, objects in display list 325 may be processed and a value may be set for one or more flags associated with pixels. In some embodiments, a flag may include a plurality of bits where some fraction of the bits in the flag can be used to include information associated with a pixel. For example, one of the bits in the flag can be used to indicate if a pixel has been painted (or not painted), while other bits may be used to indicate information such as (but not limited to) source, class type (such as text, graphics, gradient, image, etc.), painted (or not painted) for trapping purposes, and/or other such information about that pixel.

For the purposes of this discussion, the terminology "painted" and "unpainted" is used hereinafter to indicate a pixel classification for trapping purposes. As each object is processed in step 430, pixels corresponding to that object may be flagged as painted based on specified pixel attributes and a corresponding painted flag can be set as true. For example, setting a bit in a flag may assign a logic '1' to the value of the bit, while resetting a bit in the flag may assign a logic '0' to the value of the bit. In general, a plurality of multi-bit flags may be associated with any pixel to indicate various conditions, pixel attributes, and object-related parameters. However, for ease of description, the embodiments are described with reference to a painted flag, which indicates whether a pixel in the frame buffer is deemed to be associated with an object for the purposes of a trapping algorithm. In some embodiments, each pixel in the frame buffer may have a distinct painted flag associated with the pixel.

In some embodiments, as each object is processed in step 430, flags associated with the pixels corresponding to the object may be stored in an object flag buffer such as exemplary object flag buffer 455, which may be physically located in memory 172. In some embodiments, there may be a one to one correspondence between flags in flag buffer 455 and pixels in frame buffer 350. In some embodiments, flag buffer 455 may be implemented as one or more 2-dimensional arrays. In some embodiments, flag buffer 455 may be configured with the same geometry as frame buffer 350 so that locations in frame buffer 350 may be correlated directly with locations in flag buffer 455. In some embodiments, flag buffer 455 may be logically separate from frame buffer 350 and each pixel may be assigned a flag and written into an appropriate location in flag buffer 455.

As each object in display list 325 is rasterized, in step 430, the painted flags (in flag buffer 455) associated with pixels corresponding to the object can be set as true based on conditions associated with the pixel. Typically, in pixel based trapping of the raster buffer, the direction of color contribution or color flow is from regions of higher luminosity to regions of lower luminosity. However, pixels in regions that are white may be ignored by trapping algorithms. For example, a pixel P1 with Cyan, Magenta, Yellow, and Black values corresponding to (C,M,Y,K)=(0,0,0,0) may be considered unpainted and the painted flag associated with pixel P1 may be updated to indicate that pixel P1 is unpainted. Therefore, pixel P1 may not be selected as a trapping candidate by subsequent trapping algorithms. Therefore, pixel P1 may neither contribute color to other neighboring pixels, nor receive a color contribution from its neighbors.

From the standpoint of human visual perception, however, there is a range of high luminosity values that are difficult for the human eye to distinguish from white. Therefore, a luminosity threshold may be used to identify pixels that can be considered perceptually equivalent to white. In general, if the luminosity value for the pixel exceeds the luminosity threshold then a flag or other indicator associated with the pixel may be updated to indicate that the pixel is unpainted to a trapping algorithm. On the other hand, if the luminosity value of a pixel is not greater than the luminosity threshold then a flag or other indicator associated with the pixel may be updated to indicate that the pixel is painted to a trapping algorithm. In some embodiments, a luminosity threshold may be pre-determined and/or user-selectable from a range of specified values.

In some embodiments, the value of the painted flag associated with the pixel may be changed based on its luminosity but the color value of the pixel may be left unchanged. For example, if at the time of rasterization, the luminosity value for a pixel being painted is considered above some luminosity threshold then the painted flag associated with that pixel can be reset to false (or "0" to indicate that it is unpainted for trapping purposes) even though the pixel retains its color value.

In some embodiments, the value of a painted flag may be used by a trapping algorithm to determine if a pixel is a trapping candidate. In some embodiments, pixels associated with flags that are marked unpainted may be ignored by trapping algorithms thereby reducing the number of pixels considered as trapping candidates. When trapping is performed, the value of a painted flag that is used for trapping determinations may be checked and used to determine whether the pixel is a candidate for trapping. For example, if the painted flag used for the trapping determination is false ("0")—indicating that the pixel is unpainted—then the pixel can be ignored by trapping algorithms. Accordingly, the number of pixels processed during luminosity calculations (to determine the direction of color flow), as well as for trapping contributions (to determine the quantum of color contributed) can be decreased.

In some cases, when an object is placed into frame buffer 350, pixels associated with the object may overlay portions of one or more objects already in frame buffer 350. An object that overlaps another can be opaque or non-opaque. In some embodiments, display list 325 can include information that may indicate if an object is opaque or non-opaque. In some embodiments, when an object that is currently being processed overlaps with another previously processed object in frame buffer 350, flags associated with pixels that are related to the two overlapping objects may also be modified. The nature of flag modification may depend on the nature of overlap between objects.

For example, when a non-transparent or opaque object is overlaid over one or more prior objects in frame buffer 350, the operation is termed an opaque operation because pixels of the newly laid object will completely obscure any underlying overlapping pixels. In other words, all pixels common to the objects will take on pixel values of the current object when the current object is written into frame buffer 350. In some embodiments, during an opaque operation, flags associated with the pixels related to the underlying objects can be overwritten with the corresponding flag values of the pixels associated with the new (overlaying) opaque object. For example, a pixel previously marked painted may now be marked as unpainted if the luminosity value of the pixel in the overlaying object exceeds the luminosity threshold.

Similarly, when a transparent or partially transparent object is overlaid over one or more prior objects in frame buffer 350, the operation is termed a non-opaque operation. In non-opaque operations, pixel values are blended so that the final value of any common pixels is some convolution of the pixel values of the overlapping objects. In some embodiments, during a non-opaque operation, flag values associated with overlapping pixels may be altered based on the post-blending luminosity value. Thus, the luminosity value of an overlapping pixel after the blending operation may be compared to the luminosity threshold and used to assign a value to the painted flag associated with the pixel.

In step 440, a flag analysis routine can be used to analyze flag buffer 455 and frame buffer 350 to identify pixels that are candidates for trapping. Pixels identified as candidates for trapping may be processed in step 360 using standard trapping algorithms. In some embodiments, flag analysis routine of step 440 may be included as part of the trapping algorithm in step 360.

Figure 5:
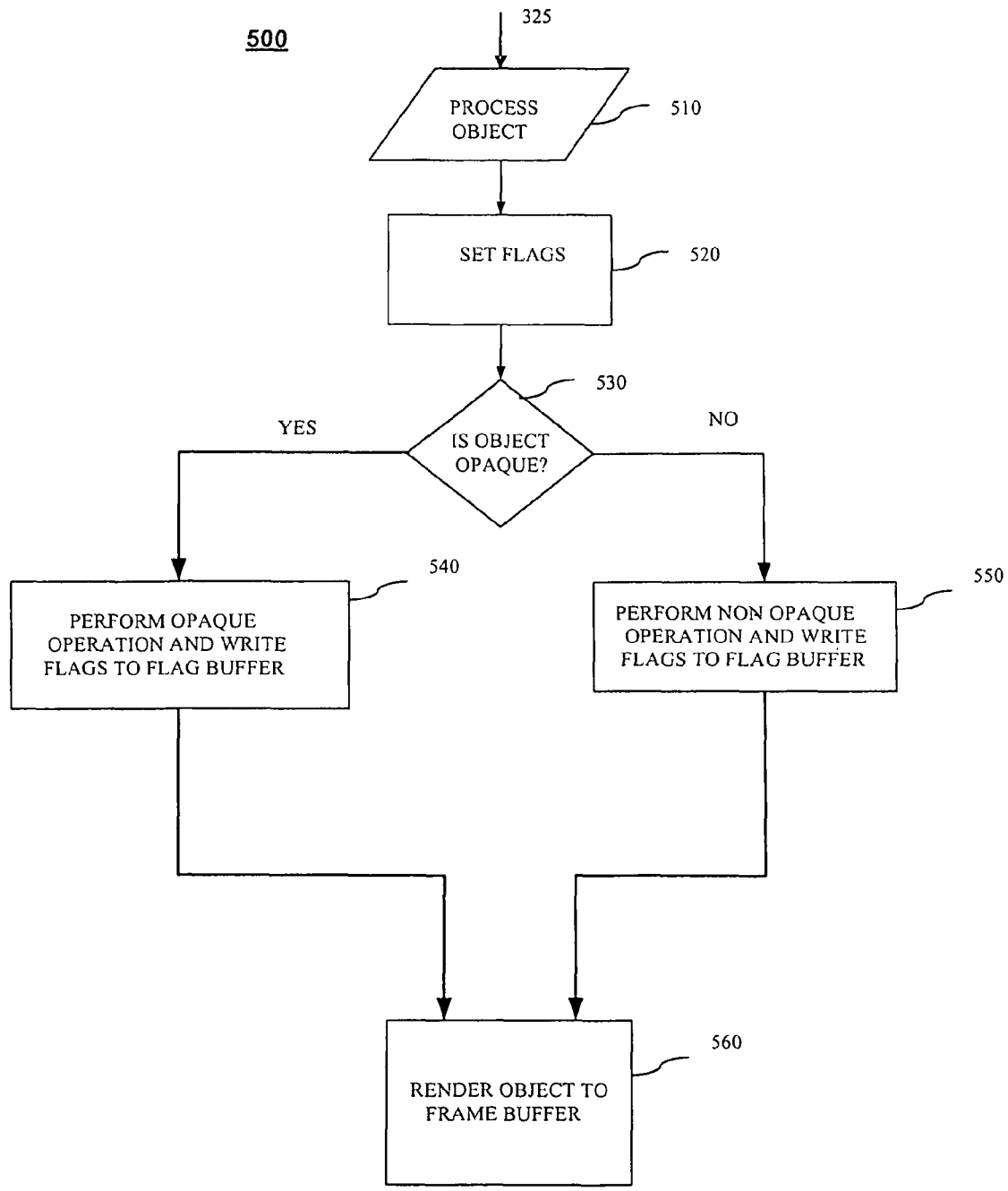
FIG. 5 shows a flowchart illustrating an exemplary method for setting flags associated with pixels in the frame buffer.

FIG. 5 shows a flowchart 500 illustrating an exemplary method for setting flags associated with pixels in frame buffer 350. In some embodiments, the method in flowchart 500 may be implemented as part of flag setting routine in step 430. The algorithm may commence in step 510 by processing an object from an object stream derived from display list 325. In some embodiments, the values of painted flags in flag buffer 455 associated with pixels in frame buffer 350 may be initialized to "0" or unpainted.

In step 520, the values of painted flags (and any other flags) associated with pixels corresponding to the current object being processed can be set. In some embodiments, in step 520, painted flags associated with pixels corresponding to the object, which do not exceed the luminosity threshold, can be set as true to indicate that the pixels have been painted and are currently candidates for trapping.

In step 530, parameters associated with the object may be checked to determine if the object is opaque or not. If the object is opaque ("YES"), then, in step 540, an opaque operation may be performed and the painted flag associated with pixels corresponding to the object may be written to flag buffer 455.

If in step 530, the object is non-opaque ("NO"), then in step 550, a non-opaque operation may be performed and the flags associated with pixels corresponding to the overlap between the objects may be written to flag buffer 455 based on the post-blending luminosity values of the overlapping pixels. Flag values for non-overlapping pixels associated with pre-existing objects in frame buffer 350 retain their prior values. Flag values for non-overlapping pixels associated with the current object are updated based on the luminosity values of the pixels in the current object. In step 560, the object can be rendered to frame buffer 350.

Figure 6A:
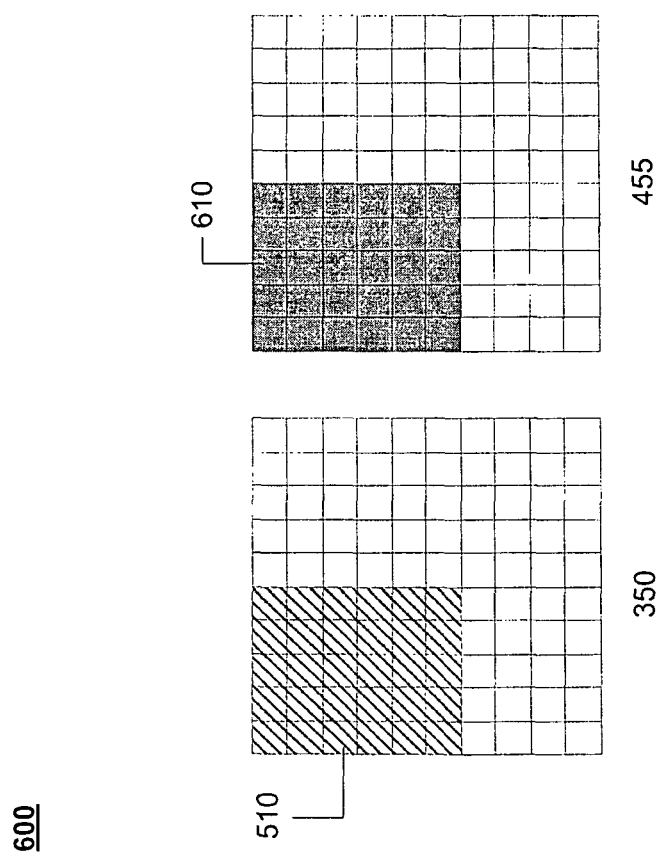

FIGS. 6A, 6B, 6C, and 6D are exemplary illustrations of changes to painted flags associated with pixels when opaque and non-opaque operations are performed on graphical objects. An exemplary graphical illustration 600 of flags associated with pixels for a graphical object in frame buffer 350 is shown in FIG. 6A. As shown in FIG. 6A, graphical object 510 is painted in empty frame buffer 350, and flags 610 associated with pixels representing graphical object 510 may be updated in flag buffer 455. Flags 610 in frame buffer 455 may include a painted flag or a painted bit. As shown in FIG. 6A, the painted flags in region 610 associated with pixels corresponding to object 510 take on the value of "1" (painted) because the luminosity values of pixels associated with object 510 do not exceed the luminosity threshold.

Figure 6B:
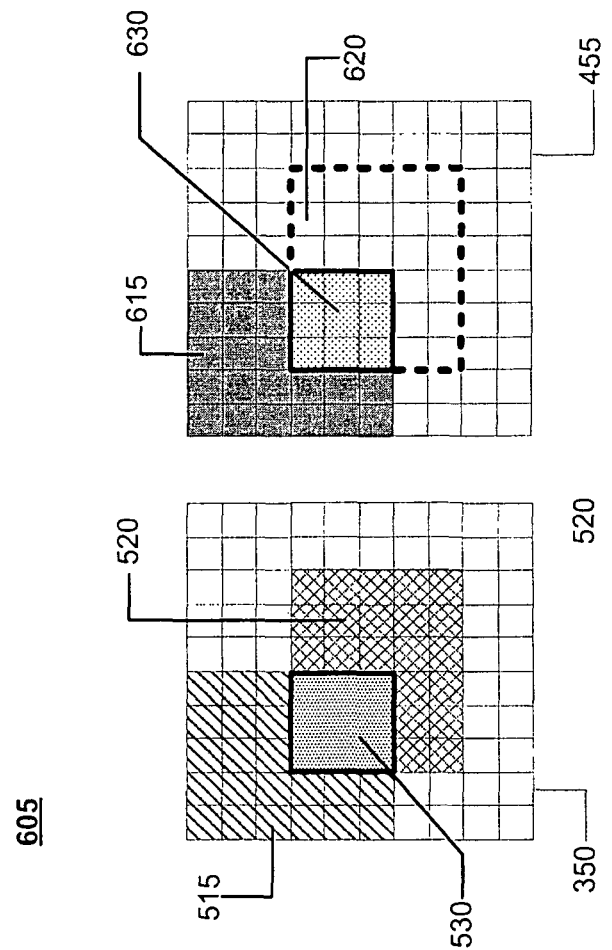

FIG. 6B is an illustration 605 depicting pixels in frame buffer 350 and corresponding flags in frame buffer 455 that are associated with an exemplary new non-opaque color object 520, which has been placed on top of pre-existing object 515. The overlapping of object 515 with non-opaque object 520 creates overlapping common area 530. As shown in FIG. 6b, the painted flag regions associated with pixels in objects 515, 520, and 530 are 615, 620, and 630, respectively. As shown in FIG. 6B, the values of flags in region 615 are based on the luminosity values of pixels associated with object 515 that are outside overlapping area 530, while the values of flags in region 620 (shown by dotted lines) are based on the luminosity values of non-overlapping pixels associated with object 520. Because the luminosity values of pixels associated with object 520 exceed the luminosity threshold, flags in region 620 in flag buffer 455 are marked as unpainted. The values of flags in the overlapping region 530 are based on the luminosity values of the pixels after blending operations on objects 515 and 520 have completed.

Figure 6C:
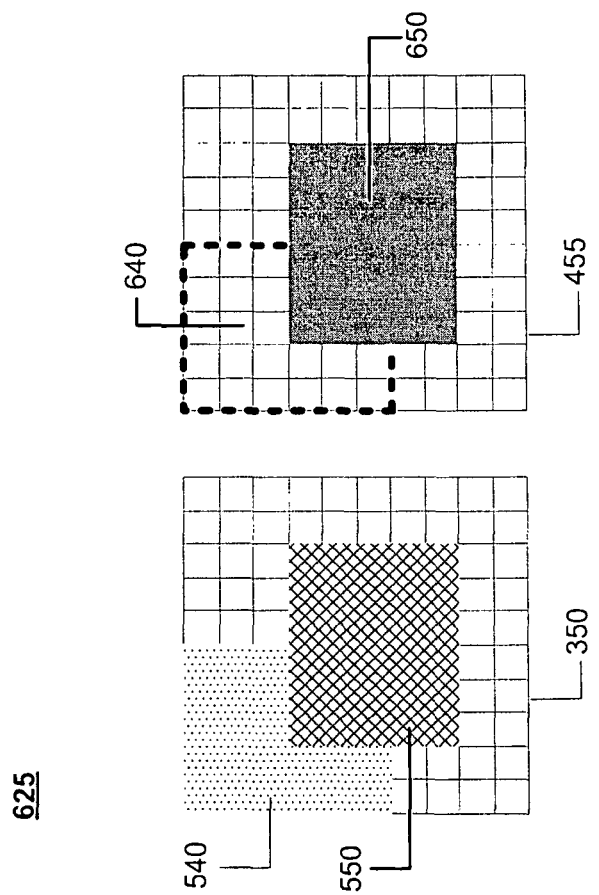

FIG. 6C is an illustration 615 depicting exemplary pixels in frame buffer 350 and corresponding flags in frame buffer 455 that are associated with an exemplary new opaque color object 550, which has been placed on top of pre-existing object 540. As shown in FIG. 6C, the luminosity values for non-overlapping pixels associated with object 540 exceed the luminosity threshold. Therefore, flag values for these pixels corresponding to region 640 (shown by dotted lines) in flag buffer 455 are marked as unpainted. As also shown in FIG. 6C, the luminosity values for pixels that are associated with opaque object 550 do not exceed the luminosity threshold. Therefore, flag values for these pixels corresponding to region 650 in flag buffer 455 are marked as painted.

FIG. 6D is an illustration 665 depicting exemplary pixels in frame buffer 350 and corresponding flags in frame buffer 455 that are associated with an exemplary new opaque color object 570, which has been placed on top of pre-existing object 560. As shown in FIG. 6D, the luminosity values for pixels associated with object 570 exceed the luminosity threshold. Therefore, flag values for these pixels corresponding to region 670 (shown by dotted lines) in flag buffer 455 are marked as unpainted. As also shown in FIG. 6c, the luminosity values for non-overlapping pixels that are associated with opaque object 560 do not exceed the luminosity threshold. Therefore, flag values for these pixels corresponding to region 660 in flag buffer 455 are marked as painted.

Figure 7:
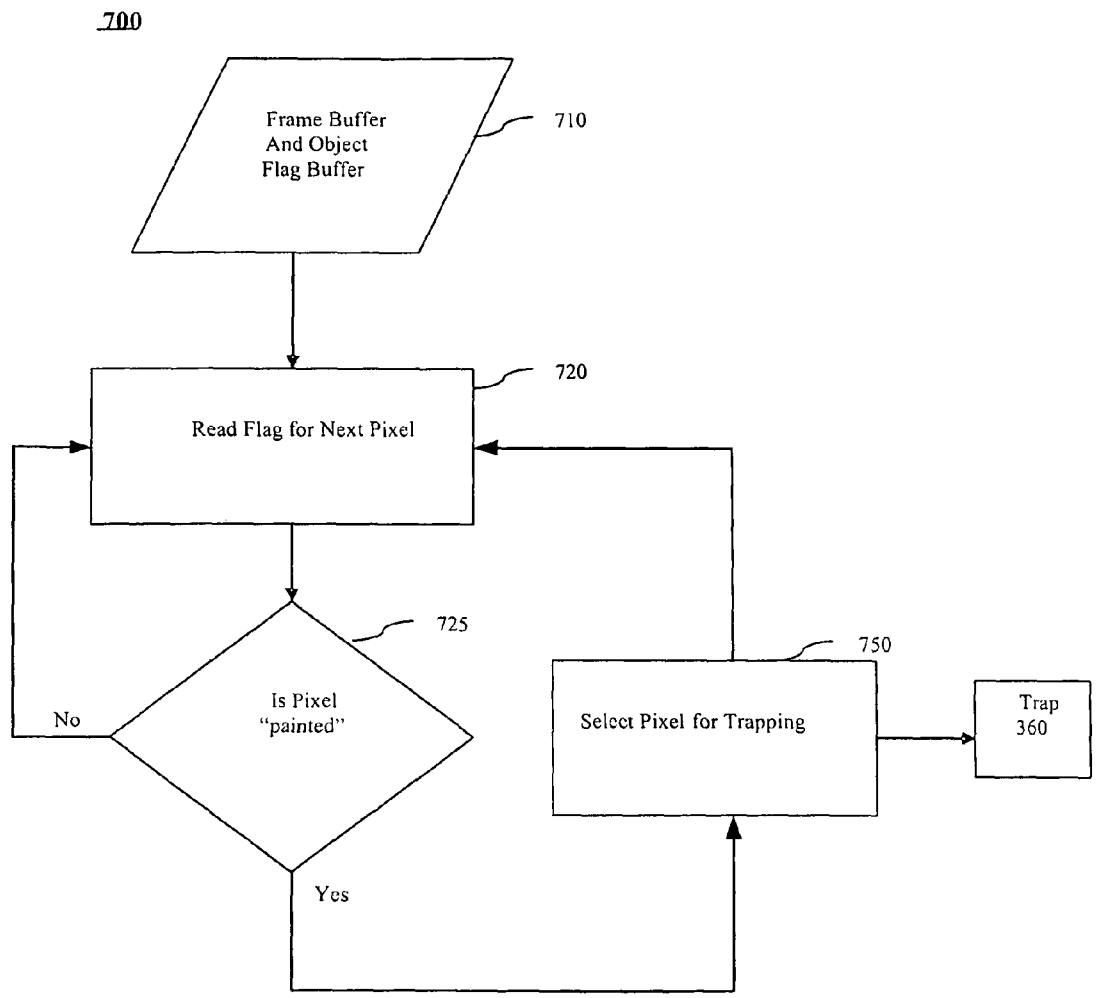
FIG. 7 shows a flowchart illustrating an exemplary method for analyzing flags associated with pixels.

FIG. 7 shows exemplary flowchart 700 illustrating steps involved in the flag analysis routine that may be implemented in step 440 consistent with some disclosed embodiments. The algorithm may commence in step 710 by accessing data in frame buffer 350 and flag buffer 455. In step 720, flags associated with a pixel in frame buffer 350 may be read. In step 725, the painted flag associated with the pixel may be checked. If the painted flag is false, then in step 720, flags associated with a new pixel may be read from flag buffer 455. When the painted flag associated with a pixel has not been set, then that pixel either does not correspond to any objects in frame buffer 350, or has a luminosity value that exceeds the luminosity threshold and may therefore be ignored for trapping purposes.

If in step 725, if the painted flag is true, then the pixel is selected as a candidate for trapping, in step 750. In step 720, flags associated with the next pixel are read from flag buffer 455. In some embodiments, the pixels selected in step 750 may be used by a trapping algorithm, such as the trapping algorithm of step 360, and trapping can be applied to the selected pixels based on trapping algorithm parameters.

In some embodiments, a program for conducting the above process can be recorded on computer-readable media 150 or computer-readable memory. These include, but are not limited to, Read Only Memory (ROM), Programmable Read Only Memory (PROM), Flash Memory, Non-Volatile Random Access Memory (NVRAM), or digital memory cards such as secure digital (SD) memory cards, Compact Flash™, Smart Media™, Memory Stick™, and the like. In some embodiments, one or more types of computer-readable media may be coupled to printer 170. In certain embodiments, portions of a program to implement the systems, methods, and structures disclosed may be delivered over network 140.

Other embodiments of the present invention will be apparent to those skilled in the art from consideration of the specification and practice of one or more embodiments of the invention disclosed herein. It is intended that the specification and examples be considered as exemplary only, with a true scope and spirit of the invention being indicated by the following claims.

What is claimed is:

1. A computer-implemented method for identifying at least one frame buffer pixel associated with at least one display list object from a display list containing a plurality of display list objects as a candidate for trapping, by associating at least one flag with the at least one frame buffer pixel, the method comprising the computer-implemented steps of:

calculating a respective value for a first bit in the at least one flag when rendering the at least one frame buffer pixel to a frame buffer for each respective display list object in the display list associated with the at least one frame buffer pixel, wherein the at least one frame buffer pixel is associated with a plurality of respective display list objects, by:

setting the first bit in the at least one flag, if a luminosity value of the at least one frame buffer pixel does not exceed a luminosity threshold and the object is opaque;

resetting the first bit in the at least one flag, if the luminosity value of the at least one frame buffer pixel exceeds a luminosity threshold and the object is opaque;

setting the first bit in the at least one flag, if a blended luminosity value of the at least one frame buffer pixel does not exceed a luminosity threshold and the object is non-opaque; and, resetting the first bit in the at least one flag, if the blended luminosity value of the at least one frame buffer pixel exceeds at luminosity threshold and the object is non-opaque; and identifying the at least one frame buffer pixel as a candidate for trapping, if the first bit in the flag associated with the at least one frame buffer pixel has been set.

2. The method of claim 1, wherein the at least one flag is stored in a flag buffer.

3. The method of claim 2, wherein the flag buffer is implemented as at least one two-dimensional array.

4. The method of claim 2, wherein the flag buffer is configured with a same geometry as the frame buffer.

5. The method of claim 2, wherein the flag buffer is logically separate from the frame buffer.

6. The method of claim 2, wherein the at least one flag in the flag buffer has a one to one correspondence with the at least one frame buffer pixel in the frame buffer.

7. The method of claim 1, wherein the luminosity threshold is user selectable.

8. The method of claim 1, wherein the blended luminosity value is computed as a convolution of a current value of the at least one frame buffer pixel and a value of a corresponding pixel in the respective display list object.

9. The method of claim 1, wherein the method is performed during rasterization of the at least one display list object.

10. The method of claim 1, wherein the method is performed in conjunction with the rendering of the at least one display list object into a frame buffer.

11. The method of claim 1, wherein the method is performed on one or more of:
   a computer; and
   a printing device.

12. A non-transitory computer-readable medium that stores instructions, which when executed by a processor perform steps in a method for identifying at least one frame buffer pixel associated with a respective display list object from a display list containing a plurality of display list objects as a candidate for trapping, by associating at least one flag with the at least one frame buffer pixel, the method comprising the computer-implemented steps of:
   calculating a respective value for a first bit in the at least one flag when rendering the at least one frame buffer pixel to a frame buffer for each respective display list object in the display list associated with the at least one frame buffer pixel, wherein the at least one frame buffer pixel is associated with a plurality of respective display list objects, by:
      setting the first bit in the at least one flag, if a luminosity value of the at least one frame buffer pixel does not exceed a luminosity threshold and the object is opaque;
      resetting the first bit in the at least one flag, if the luminosity value of the at least one frame buffer pixel exceeds a luminosity threshold and the object is opaque;
      setting the first bit in the at least one flag, if a blended luminosity value of the at least one frame buffer pixel does not exceed a luminosity threshold and the object is non-opaque; and,
      resetting the first bit in the at least one flag, if the blended luminosity value of the at least one frame buffer pixel exceeds a luminosity threshold and the object is non-opaque; and
   identifying the at least one frame buffer pixel as a candidate for trapping, if the first bit in the flag associated with the at least one frame buffer pixel has been set.

13. The non-transitory computer-readable medium of claim 12, wherein the at least one flag is stored in a flag buffer.

14. The non-transitory computer-readable medium of claim 13, wherein the flag buffer is configured with a geometry identical to the frame buffer.

15. The non-transitory computer-readable medium of claim 12, wherein the blended luminosity value is computed as a convolution of a current value of the at least one frame buffer pixel and a value of a corresponding pixel in the respective display list object.

16. The non-transitory computer-readable medium of claim 12, wherein the method is performed in conjunction with the rendering of the at least one display list object into a frame buffer.

17. A computer readable memory containing instructions for controlling a processor to perform steps in a method for identifying at least one frame buffer pixel associated with a respective display list object from a display list containing a plurality of display list objects as a candidate for trapping, by associating at least one flag with the at least one frame buffer pixel, the method comprising the computer-implemented steps of:
   calculating a respective value for a first bit in the at least one flag when rendering the at least one frame buffer pixel to a frame buffer for each respective display list object in the display list associated with the at least one frame buffer pixel, wherein the at least one frame buffer pixel is associated with a plurality of respective display list objects, by:
      setting the first bit in the at least one flag, if a luminosity value of the at least one frame buffer pixel does not exceed a luminosity threshold and the object is opaque;
      resetting the first bit in the at least one flag, if the luminosity value of the at least one frame buffer pixel exceeds a luminosity threshold and the object is opaque;
      setting the first bit in the at least one flag, if a blended luminosity value of the at least one frame buffer pixel does not exceed a luminosity threshold and the object is non-opaque; and,
      resetting the first bit in the at least one flag, if the blended luminosity value of the at least one frame buffer pixel exceeds a luminosity threshold and the object is non-opaque; and
   identifying the at least one frame buffer pixel as a candidate for trapping, if the first bit in the flag associated with the at least one frame buffer pixel has been set.

18. The computer-readable memory of claim 17, wherein the at least one flag is stored in a flag buffer.

19. The computer-readable memory of claim 18, wherein the flag buffer is configured with a geometry identical to the frame buffer.

20. The computer-readable memory of claim 18, wherein the flag buffer is logically separate from the frame buffer.

* * * * *